(12) United States Patent
Iguchi et al.

(10) Patent No.: US 10,511,066 B2
(45) Date of Patent: Dec. 17, 2019

(54) BATTERY PACK COOLING SYSTEM

(71) Applicant: Nissan Motor Co., Ltd., Yokohama-shi, Kanagawa (JP)

(72) Inventors: Toyoki Iguchi, Kanagawa (JP); Hiroaki Hashimoto, Kanagawa (JP); Masayoshi Saeki, Kanagawa (JP); Hiroaki Saitou, Kanagawa (JP); Shigeyuki Kiyota, Kanagawa (JP); Yoshiyuki Tanaka, Kanagawa (JP); Hiroshi Iwata, Hitachinaka (JP); Hiroshi Hoshi, Hitachinaka (JP); Akira Kotaki, Hitachinaka (JP); Nayuta Yamachi, Hitachinaka (JP); Toshiyuki Yoshida, Hitachinaka (JP); Chikara Kikkawa, Hitachinaka (JP); Takeshi Haga, Hitachinaka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/269,631

(22) Filed: Feb. 7, 2019

(65) Prior Publication Data
US 2019/0173135 A1 Jun. 6, 2019

Related U.S. Application Data

(62) Division of application No. 14/914,275, filed as application No. PCT/JP2014/069557 on Jul. 24, 2014, now Pat. No. 10,249,913.

(30) Foreign Application Priority Data

Sep. 6, 2013 (JP) ................................ 2013-184608

(51) Int. Cl.
*H01M 10/42* (2006.01)
*H01M 10/48* (2006.01)
(Continued)

(52) U.S. Cl.
CPC ......... *H01M 10/4257* (2013.01); *B60L 50/64* (2019.02); *B60L 58/18* (2019.02);
(Continued)

(58) Field of Classification Search
CPC ............. B60L 11/1874; H01M 10/613; H01M 10/486; H01M 2/1077; H01M 2010/4287
See application file for complete search history.

(56) References Cited

U.S. PATENT DOCUMENTS

| | | |
|---|---|---|
| 2004/0257089 A1 | 12/2004 | Aridome |
| 2007/0072061 A1 | 3/2007 | Shimizu |

FOREIGN PATENT DOCUMENTS

| | | |
|---|---|---|
| JP | 2003-109648 A | 4/2003 |
| JP | 2006-318863 A | 11/2006 |

(Continued)

*Primary Examiner* — Stephan J Essex
(74) *Attorney, Agent, or Firm* — Global IP Counselors, LLP

(57) ABSTRACT

A battery pack cooling system includes a plurality of cells disposed in an internal space of a battery pack case so as to form a cooling passage configured to cool the cell modules by cooling air flowing in the cooling passage. The cooling passage includes a cooling air inlet passage, a cooling air exhaust passage, and a plurality of cooling branch passages disposed to connect the cooling air inlet passage and the cooling air exhaust passage in parallel. A minimum temperature sensor is disposed in the upstream position to measure a lowest temperature region in a first cell module. A maximum temperature sensor is disposed in the downstream position which becomes a highest temperature region in the first cell module. Another temperature sensor is disposed in a second cell module to measure the temperature of either the highest temperature or the lowest temperature in the second cell module.

7 Claims, 6 Drawing Sheets

(51) Int. Cl.
*H01M 10/613* (2014.01)
*H01M 10/625* (2014.01)
*H01M 10/643* (2014.01)
*H01M 10/6556* (2014.01)
*H01M 10/6563* (2014.01)
*H01M 10/6566* (2014.01)
*H01M 10/63* (2014.01)
*H01M 2/10* (2006.01)
*H01M 10/637* (2014.01)
*B60L 58/18* (2019.01)
*B60L 58/26* (2019.01)
*B60L 50/64* (2019.01)
*H01M 10/633* (2014.01)

(52) U.S. Cl.
CPC ........... *B60L 58/26* (2019.02); *H01M 2/1077* (2013.01); *H01M 10/482* (2013.01); *H01M 10/486* (2013.01); *H01M 10/613* (2015.04); *H01M 10/625* (2015.04); *H01M 10/63* (2015.04); *H01M 10/637* (2015.04); *H01M 10/6556* (2015.04); *H01M 10/6563* (2015.04); *H01M 10/6566* (2015.04); *B60L 2240/545* (2013.01); *H01M 10/425* (2013.01); *H01M 10/633* (2015.04); *H01M 10/643* (2015.04); *H01M 2010/4271* (2013.01); *H01M 2010/4278* (2013.01); *H01M 2220/20* (2013.01); *Y02T 10/7005* (2013.01); *Y02T 10/705* (2013.01)

(56) References Cited

FOREIGN PATENT DOCUMENTS

| | | |
|---|---|---|
| JP | 2013-030375 A | 2/2013 |
| JP | 2013-097982 A | 5/2013 |

BATTERY PACK COOLING SYSTEM

CROSS-REFERENCE TO RELATED APPLICATIONS

This application is a divisional application of Ser. No. 14/914,275, filed on Feb. 25, 2016, which is a U.S. National stage application of International Application No. PCT/JP2014/069557, filed Jul. 24, 2014, which claims priority to Japanese Patent Application No. 2013-184608 filed in Japan on Sep. 6, 2013, the contents of each of which are herein incorporated by reference.

BACKGROUND

Field of the Invention

The present invention relates to a battery pack cooling system for cooling cell modules by cooling air flowing in a cooling passage disposed in an internal space of a battery pack case.

Background Information

A conventionally known temperature control device for a battery pack comprises a battery pack for housing a plurality of batteries, a high-efficiency heat conducting member disposed between a position in the battery pack that is the lowest temperature at the time of cooling and a position in the battery pack that is the highest temperature at the time of cooling, and a temperature measuring means for measuring the temperature of the high-efficiency heat conducting member. Then, the temperature inside the battery pack is controlled to within an optimum temperature range based on the temperature measurement results of the temperature measuring means (for example, Japanese Laid-Open Patent Application No. 2013-30375).

SUMMARY

However, in a conventional temperature control device for a battery pack, a thermistor installed in a cooling passage is used as the temperature measuring device for measuring the temperature of a high-efficiency heat conducting member. Consequently, there is the problem that, while the temperature of the entire battery pack can be measured, the temperature distribution of each cooling passage cannot be detected, and clogging that inhibits the flow of cooling air cannot be detected. On the other hand, the problem exist that to allow the detection of clogging and temperature distribution of cooling passages, a plurality of thermistors are required with respect to each cooling passage, increasing the number of thermistors installed.

In view of the problems described above, an object of the present invention is to provide a battery pack cooling system capable of controlling battery temperature, battery input/output control, and cell module clogging diagnostics while keeping the number of temperature sensors installed to a minimum.

In order to achieve the object above, in the present invention, cell modules formed from a plurality of cells are disposed in an internal space of a battery pack case, thereby cooling the cell modules by cooling air flowing in a cooling passage that is secured between the cells that are mutually adjacent. In this battery pack cooling system, the cooling passage includes a cooling air inlet passage, a cooling air exhaust passage, and a plurality of cooling branch passages disposed to link the cooling air inlet passage to the cooling air exhaust passage in parallel. The cell modules are set respectively in the plurality of cooling branch passages. A minimum temperature sensor is disposed in an upstream position which becomes the lowest temperature, and a maximum temperature sensor is disposed in a downstream position which becomes the highest temperature, in one cell module among the plurality of cell modules. A temperature sensor that measures the temperature of either the highest temperature or the lowest temperature is disposed in one of the other cell modules, among the plurality of cell modules. A controller that carries out a calculation process based on temperature information from the temperature sensors is provided. The controller comprises a diagnostic unit that carries out rationality diagnosis of the temperature sensors using a difference between temperature change gradients from two minimum temperature sensors in which the minimum temperatures can be compared, or a difference between temperature change gradients from two maximum temperature sensors in which the maximum temperatures can be compared.

Thus, a cell module is set to each of the plurality of cooling branch passages disposed to link the cooling air inlet passage to the cooling air exhaust passage in parallel. Then, a minimum temperature sensor is disposed in an upstream position which becomes the lowest temperature, and a maximum temperature sensor is installed in a downstream position which becomes the highest temperature, in one cell module among the plurality of cell modules. In addition, a temperature sensor that measures the temperature of either the highest temperature or the lowest temperature is disposed in one of the other cell modules. That is, the minimum range temperature information can be obtained from a minimum temperature sensor disposed in an upstream position of a cell module where introduction of cooling air is started, and the maximum range temperature information can be obtained from a maximum temperature sensor disposed in a downstream position of a cell module where the cooling air that has removed heat is discharged. Therefore, battery temperature control can be carried out using the maximum range temperature information, battery input/output control can be carried out using the minimum range temperature information and the maximum range temperature information, and cell module clogging diagnostics can be carried out using the temperature difference information between the maximum range temperature and the minimum range temperature. In addition, rationality diagnosis of the temperature sensor (diagnosis on the presence/absence of rationality) can be carried out using a difference between temperature change gradients from two minimum temperature sensors in which the minimum temperatures can be compared, or a difference between temperature change gradients from two maximum temperature sensors in which the maximum temperatures can be compared. As a result, battery temperature control, battery input/output control, and cell module clogging diagnostics can be carried out, while keeping the number of temperature sensors to three.

BRIEF DESCRIPTION OF THE DRAWINGS

Referring now to the attached drawings which form a part of this original disclosure.

DETAILED DESCRIPTION OF THE EMBODIMENTS

Figure 1:
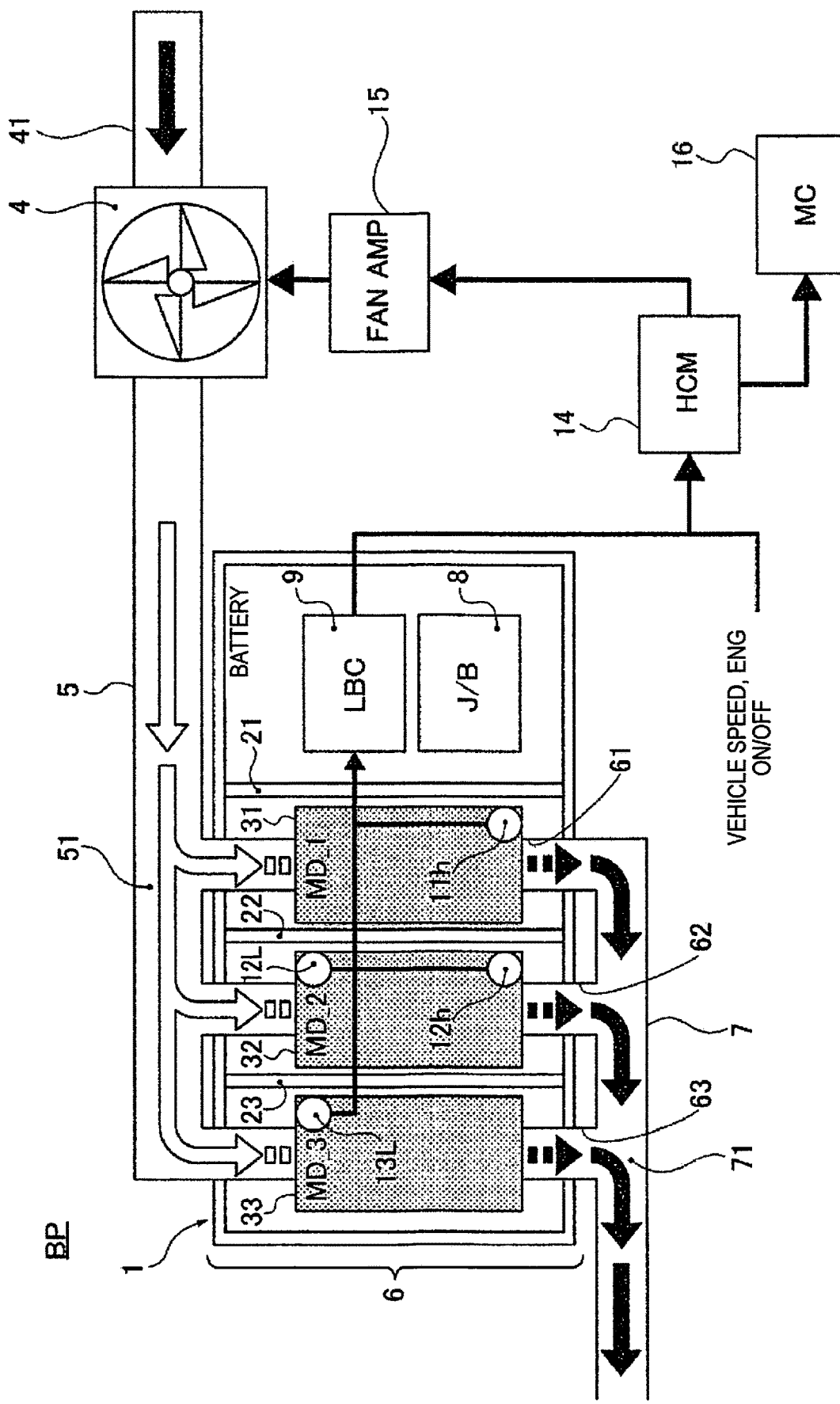
FIG. 1 is a view illustrating the overall system of a battery pack cooling system of the first embodiment applied to a hybrid vehicle equipped with a battery pack.

Preferred embodiments for realizing the battery pack cooling system of the present invention are explained below based on the first embodiment illustrated in the drawings.

First Embodiment

The configuration is described first. The Overall system configuration, Fan control configuration, Battery input/output control configuration, and Diagnostic steps configuration will be separately described regarding the configuration of the battery pack cooling system of the first embodiment.

Overall System Configuration

Figure 2:
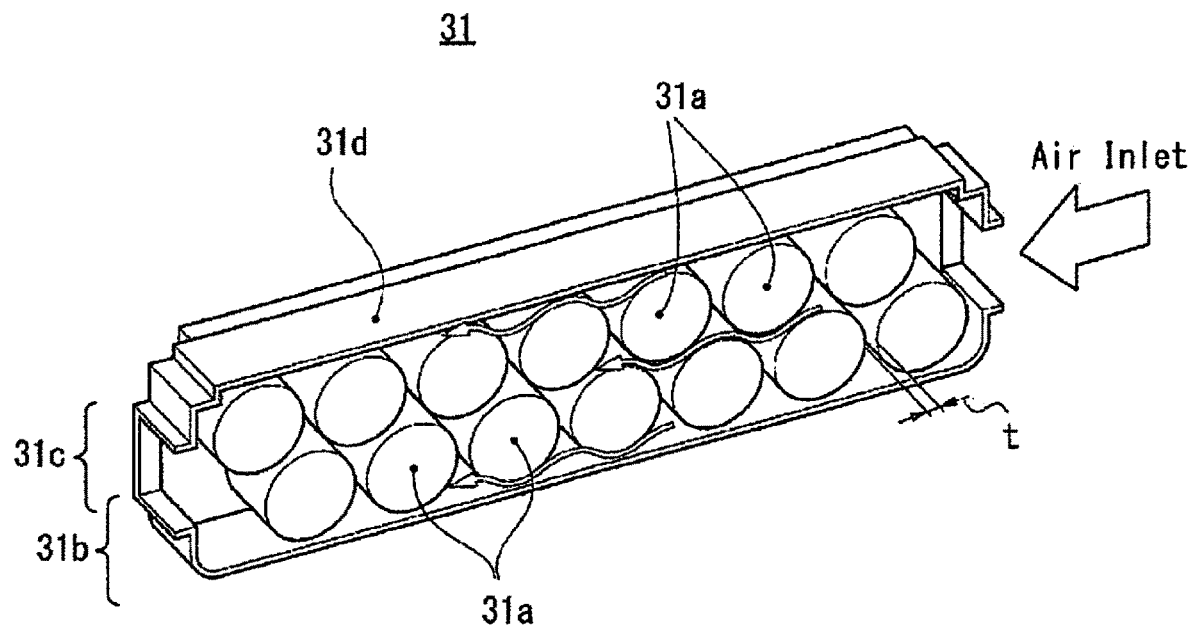
FIG. 2 is a perspective view illustrating the cell module set in the battery pack case in the battery pack cooling system of the first embodiment.
Figure 3:
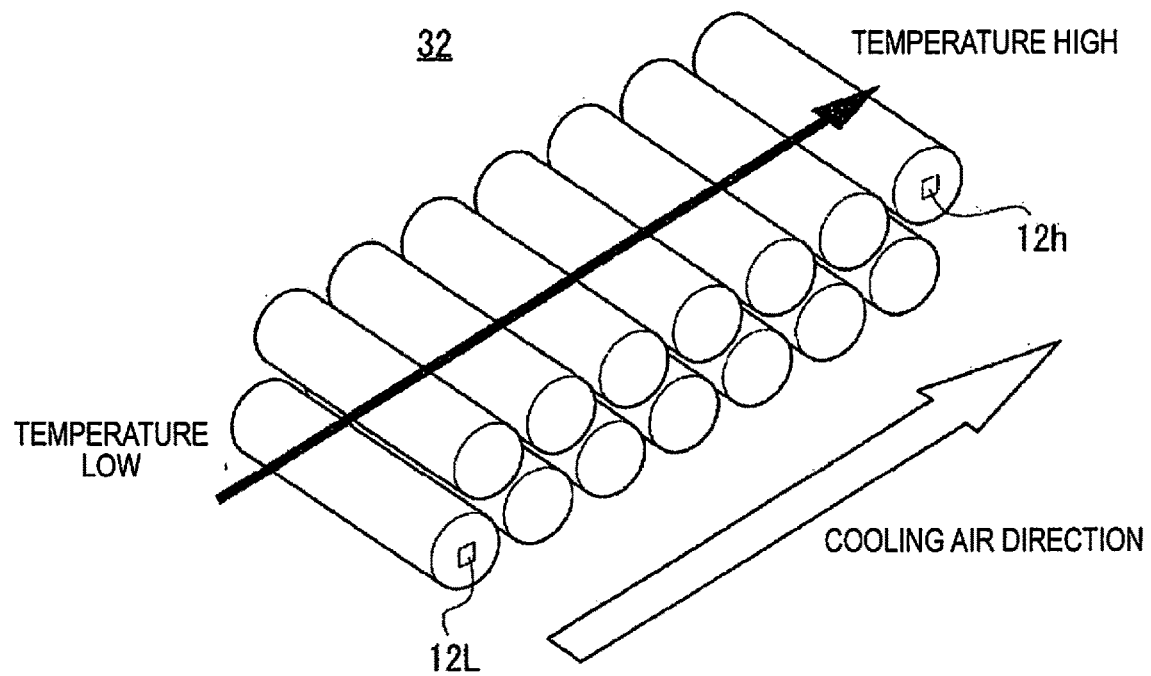
FIG. 3 is a perspective view of a cell can, illustrating the relationship between the temperature and the flow direction of the cooling air in the cell module set in the battery pack case in the battery pack cooling system of the first embodiment.

FIG. 1 illustrates the battery pack cooling system of the first embodiment applied to a hybrid vehicle equipped with a battery pack; FIG. 2 and FIG. 3 illustrate the configuration of the cell module and temperature change. The overall system configuration will be described below based on FIG. 1-FIG. 3.

The battery pack cooling system is a system in which cell modules formed from a plurality of cells are set in an internal space of a battery pack case so as to have a cooling passage, thereby cooling the cell modules by cooling air flowing in the cooling passage. The battery pack BP includes a battery pack case 1, a first partition wall 21, a second partition wall 22, a third partition wall 23, a second cell module 31, a first cell module 32, and a third cell module 33, as illustrated in FIG. 1.

The battery pack BP is a secondary battery (lithium ion battery) which is mounted as a power source for an unillustrated motor/generator 4 for traveling; the battery pack case 1 is formed from a lower case and an upper case which are joined together, and the internal space of the case is defined into four chambers by the first partition wall 21, the second partition wall 22, and the third partition wall 23.

The second cell module 31, the first cell module 32, and the third cell module 33 are disposed, one module each, to three of the four chambers defined inside the battery pack case 1. A junction box 8 (J/B) which aggregates a relay circuit for carrying out supply/cutoff/distribution of a heavy current system, and a lithium ion battery controller 9 (LBC) which monitors the battery charge capacity (battery SOC), battery temperature, and the like, are disposed in the remaining one chamber.

The cooling structure of the cell modules 31, 32, 33 comprises a cooling fan 4, a cooling air inlet duct 5, a cooling branch passage 6, and a cooling air exhaust duct 7, as shown in FIG. 1.

The cooling passage includes a cooling air inlet passage 51, a cooling air exhaust passage 71, and three cooling branch passages, a second cooling branch passage 61, a first cooling branch passage 62, and a third cooling branch passage 63, disposed to link the cooling air inlet passage 51 and the cooling air exhaust passage 71 in parallel.

The cooling fan 4 discharges the cabin interior air (cooling air) taken from an intake duct 41, one end of which is opened to the cabin interior, to the cooling air inlet duct 5.

The cooling air inlet duct 5 is formed in a tubular shape by synthetic resin, and is fixed to a long side surface of the battery pack case 1. A cooling air inlet passage 51 is formed by the inner duct space of this cooling air inlet duct 5, and the cooling air inlet passage 51 communicates with each inlet of the cooling branch passages 6 (second cooling branch passage 61, first cooling branch passage 62, third cooling branch passage 63).

The cooling branch passages 6 are formed by three branch passages, the second cooling branch passage 61, the first cooling branch passage 62, and the third cooling branch passage 63.

The second cooling branch passage 61 is disposed on the most upstream side position, of the three branch passages arranged in parallel from the upstream side to the downstream side of the flow of the cooling air; the second cell module 31 is set to this second cooling branch passage 61.

The first cooling branch passage 62 is disposed in an intermediate position, of the three branch passages arranged in parallel from the upstream side to the downstream side of the flow of the cooling air; the first cell module 32 is set to this first cooling branch passage 62.

The third cooling branch passage 63 is disposed on the most downstream side position, of the three branch passages arranged in parallel from the upstream side to the downstream side of the flow of the cooling air; the third cell module 33 is set to this third cooling branch passage 63.

The cooling air exhaust duct 7 is formed in a tubular shape by synthetic resin, and is fixed to the long side surface of the battery pack case 1 that opposes the cooling air inlet duct 5. A cooling air exhaust passage 71 is formed by the inner duct space of this cooling air inlet duct 5, and the cooling air exhaust passage 71 communicates with each outlet of the cooling branch passages 6 (second cooling branch passage 61, first cooling branch passage 62, third cooling branch passage 63). The cooling air after cooling taken from this cooling air exhaust duct 7 is discharged outside of the vehicle.

The cell modules 31, 32, 33 use modules with the same configuration; therefore, as a representative, the configuration of the second cell module 31 will be described with reference to FIG. 2. Seven cylindrical shape cell cans 31a are arranged so that the can axes are parallel to each other, to configure a first cell can line 31b and a second cell can line 31c. Then, the can axis interval of the second cell can line 31c is shifted by half pitch with respect to the first cell can line 31b and the two layers are superimposed, which are then held by a module holder 31d in a state in which a cold air passage clearance t (for example, several mm) is secured between mutually adjacent can barrels. At this time, a cold air passage clearance t is also secured between the module holder 31*d* and the cell cans 31*a*. Accordingly, cooling air that is introduced in a direction perpendicular to the can axis of the cell cans 31*a* flows drawing a weaving flow line along the surface of the can barrels of the cell cans 31*a*, as illustrated by the arrows in FIG. 2.

The mounting configuration of the thermistors (temperature sensors) to the cell modules 31, 32, 33 will be described. Four thermistors, a first thermistor 11*h* (first maximum temperature sensor), a second thermistor 12L (second minimum temperature sensor), second thermistor 12*h* (second maximum temperature sensor), and a third thermistor 13L (third minimum temperature sensor) are provided as thermistors that measure the temperature utilizing the resistance change with respect to the temperature change.

The first thermistor 11*h* is disposed in a downstream position of the second cell module 31, which can become the highest temperature region in the entire battery pack. This first thermistor 11*h* is attached to the can bottom surface of the cell can that is disposed on the farthest end position on the downstream side of the second cell module 31. Here, the reason why the downstream position of the second cell module 31 can become the highest temperature region in the entire battery pack will be explained. The reason is because, due to the shape of the cooling air inlet duct 5, the cooling air amount to the second cell module 31, which is on the nearest side from the cooling fan 4, is small; therefore, the cooling effect on the second cell module 31 becomes the lowest among the three cell modules.

The second thermistor 12L is disposed in an upstream position which can become the lowest temperature among the first cell module 32, and the second thermistor 12*h* is disposed in a downstream position which can become the highest temperature among the first cell module 32. These second thermistors 12L, 12*h* are respectively attached to the can bottom surfaces of cell cans arranged in the two end positions of the first cell module 32. Here, the reason why the second thermistor 12L and the second thermistor 12*h* are arranged in the two end positions of the first cell module 32 will be explained. When cooling a cell module with a cooling air that flows in one direction, the temperature of the cell can in an upstream position, which is cooled by a low temperature cooling air that is discharged from the cooling fan 4, can become the lowest temperature among the first cell module 32, as illustrated in FIG. 3. In contrast, the temperature of the cell can in a downstream position, which is cooled by cooling air that becomes a high temperature by removing heat from the plurality of cell cans through which the cooling air has passed, can become the highest temperature among the first cell module 32.

The third thermistor 13L is disposed in an upstream position of the third cell module 33, which can become the lowest temperature region in the entire battery pack. This third thermistor 13L is attached to the can bottom surface of the cell can that is disposed on the farthest end position on the upstream side of the third cell module 33. Here, the reason why the upstream position of the third cell module 33 can become the lowest temperature region in the entire battery pack will be explained. The reason is because, due to the shape of the cooling air inlet duct 5, the cooling air amount to the third cell module 33, which is on the farthest side from the cooling fan 4, is large; therefore, the cooling effect on the third cell module 33 becomes the highest among the three cell modules.

The configuration of the control system using temperature information from the first thermistor 11*h*, the second thermistor 12L, the second thermistor 12*h*, and the third thermistor 13L will be described. The lithium ion battery controller 9 is connected to the hybrid control module 14 (HCM) by a CAN communication line or the like. This hybrid control module 14 inputs information from the lithium ion battery controller 9, vehicle speed information, engine ON/OFF information, and the like. Then, the module carries out a fan control (battery temperature control) by a fan driving instruction to a fan driving circuit 15, a battery input/output control by an upper limit torque instruction to a motor controller 16 (MC), and diagnostic steps such as clogging diagnostics of the cell module. Detailed contents of the fan control, the battery input/output control, and the diagnostic steps will be described below.

Fan Control Configuration

Figure 4:
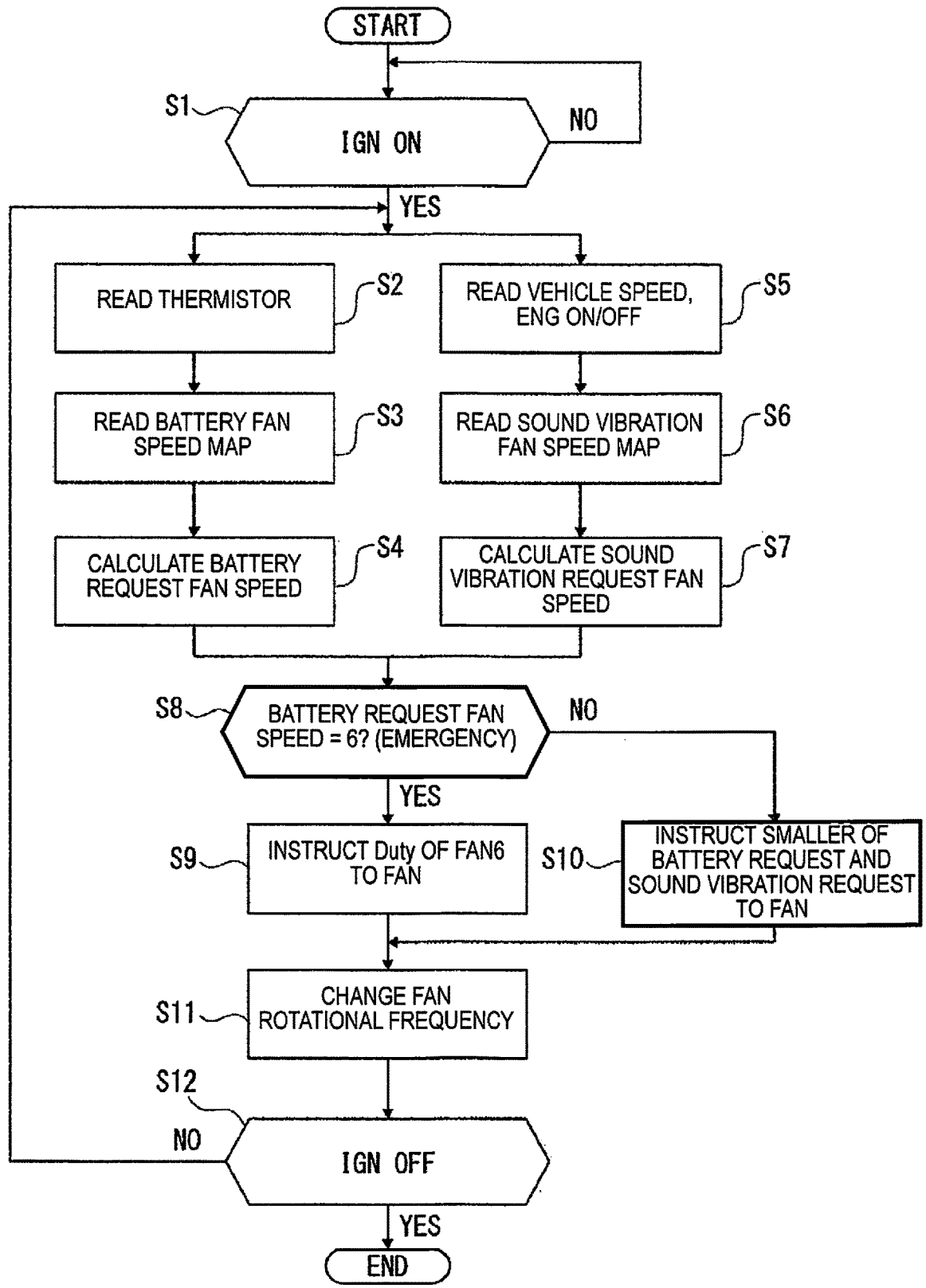
FIG. 4 is a flowchart illustrating the flow of fan control steps that are executed in a hybrid control module (HCM) of the battery pack cooling system of the first embodiment.

FIG. 4 illustrates the flow of fan control steps that are executed by the hybrid control module 14 (HCM). Each of the steps that represent the configuration of a fan control unit that controls the battery cooling air amount will be described below, with reference to FIG. 4.

Whether or not the ignition switch is ON is determined in Step S1. In the case of YES (IGN ON), the steps proceeds to Step S2 and Step S5, and in the case of NO (IGN OFF), the determination of Step S1 is repeated.

In Step S2, following an IGN ON determination in Step S1 or Step S12, thermistor temperatures Th1, TL2, Th2, TL3 are read from the first thermistor 11*h*, the second thermistor 12L, the second thermistor 12*h*, and the third thermistor 13L, and the steps proceeds to Step S3.

In Step S3, following the reading of the thermistor temperatures Th1, TL2, Th2, TL3 in Step S2, a battery FAN speed map that represents the relationship between the thermistor temperature and the FAN speed is read, and the steps proceeds to Step S4. Here, the battery FAN speed map is set to select a FAN speed that secures the battery performance, from stepped FAN speeds from FAN speed=0 (fan stopped) to FAN speed=6 (maximum fan speed). For example, the FAN speed is increased as the thermistor temperature is increased.

In Step S4, following the reading of the battery FAN speed map in Step S3, a battery request FAN speed is calculated using the battery FAN speed map and the thermistor temperature Th1, which is the highest in the entire battery pack, and the steps proceeds to step S38.

In Step S5, following an IGN ON determination in Step S1 or Step S12, the vehicle speed and the ENG ON/OFF are read, and the steps proceeds to Step S6.

In Step S6, following the reading of the vehicle speed and the ENG ON/OFF in Step S5, a sound vibration FAN speed map, which represents the relationship between the FAN speed with respect to the vehicle speed and the ENG ON/OFF, is read, and the steps proceeds to Step S7. Here, the sound vibration FAN speed map is set to select a FAN speed that secures the sound vibration performance, from stepped FAN speeds from FAN speed=0 (fan stopped) to FAN speed=6 (maximum fan speed). For example, a higher FAN speed is allowed as the vehicle speed of the vehicle is increased. In addition, a higher FAN speed is allowed when HEV traveling with the engine ON, compared to when EV traveling with the engine OFF.

In Step S7, following the reading of the sound vibration FAN speed map in Step S6, a sound vibration request FAN speed is calculated using the vehicle speed, the ENG ON/OFF, and the sound vibration FAN speed map, and the steps proceeds to Step S8. Steps S5-S7 proceed in parallel with Steps S2-S4.

In Step S8, following the calculation of the battery request FAN speed in Step S4 and the calculation of the sound vibration request FAN speed in Step S7, whether or not the battery request FAN speed is FAN speed=6 (emergency) is determined. In the case of YES (battery request FAN speed=6), the steps proceeds to Step S9, and in the case of NO (battery request FAN speed≠6), the steps proceeds to Step S10.

In Step S9, following the determination that the battery request FAN speed=6 in Step S8, a Duty according to FAN speed=6 is instructed to the fan driving circuit 15, and the steps proceeds to Step S11.

In Step S10, following the determination that the battery request FAN speed≠6 in Step S8, a Duty that obtains the smaller FAN speed, from among the battery request FAN speed and the sound vibration request FAN speed, is instructed to the fan driving circuit 15, and the steps proceeds to Step S11.

In Step S11, following the instruction to the fan driving circuit 15 in Step S9 or Step S10, an instruction to suppress a change in the FAN rotational frequency is outputted when the FAN speed is changed, and the steps proceeds to Step S12.

Whether or not the ignition switch is OFF is determined in Step S12. In the case of YES (IGN OFF), the steps proceed to END, and in the case of NO (IGN ON), the steps returns to Step S2 and Step S5.

Battery Input/Output Control Configuration

Figure 5:
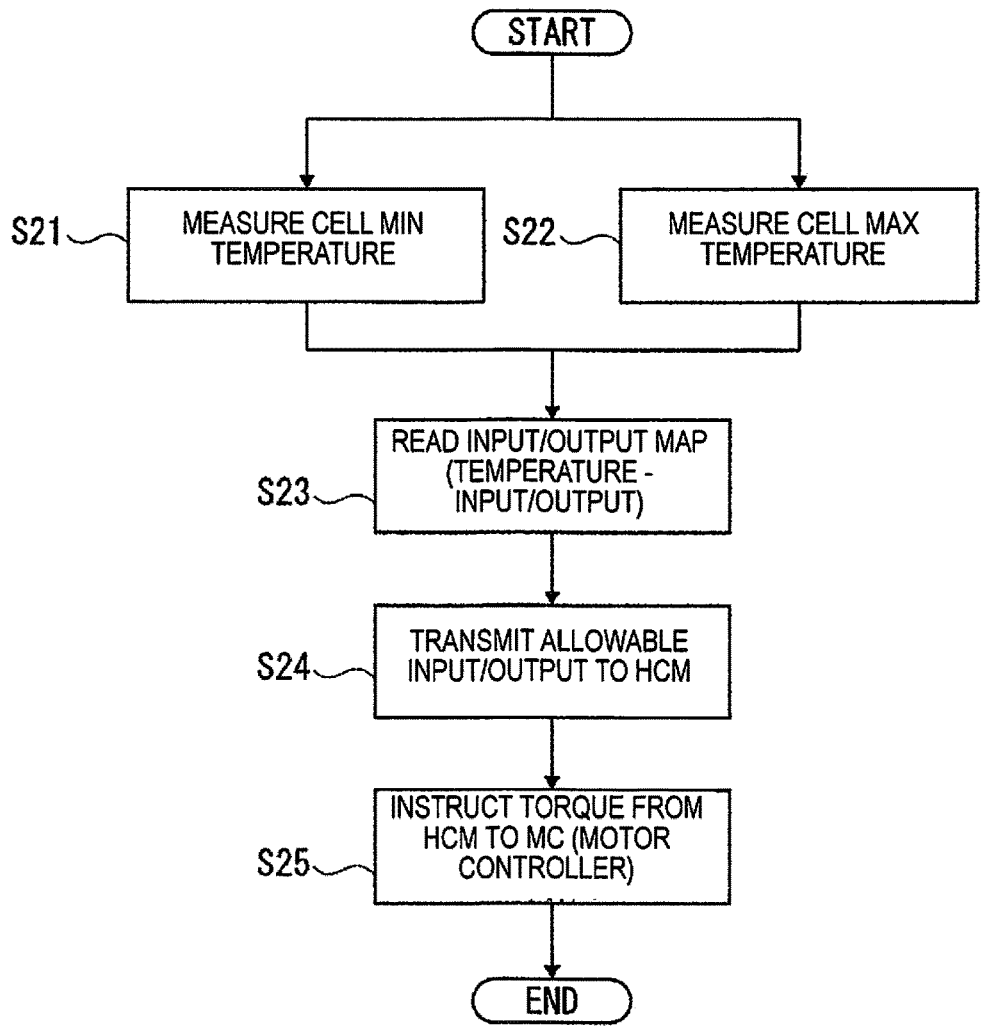
FIG. 5 is a flowchart illustrating the flow of a battery input/output control steps that are executed in the hybrid control module (HCM) and a lithium ion battery controller (LBC) of the battery pack cooling system of the first embodiment.
Figure 6:
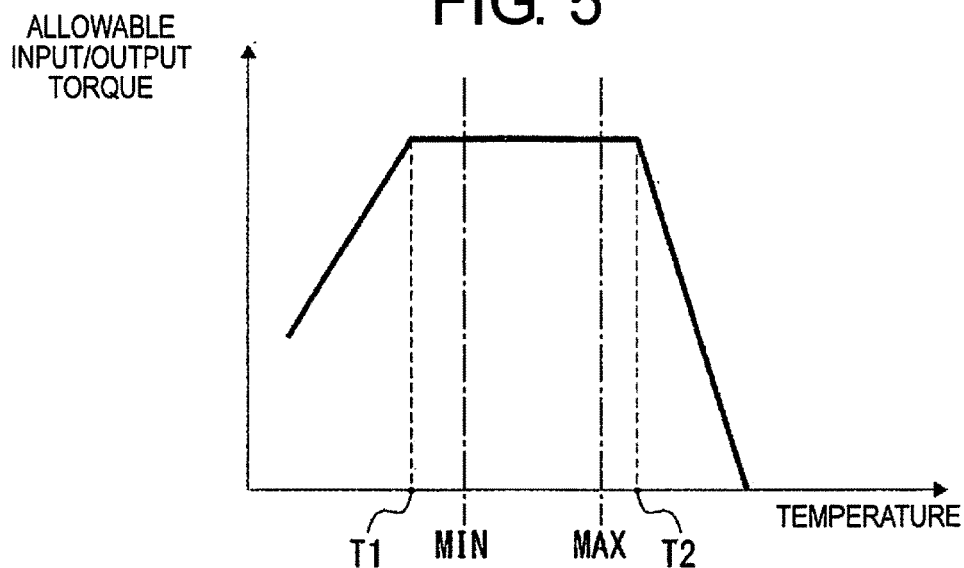
FIG. 6 is an allowable input/output characteristic diagram illustrating the relationship between the allowable input/output with respect to the cell temperature.

FIG. 5 illustrates the flow of a battery input/output control steps that are executed in the hybrid control module 14 (HCM) and the lithium ion battery controller 9 (LBC); FIG. 6 illustrates the relationship between the allowable input/output and the cell temperature. Each of the steps that represent the configuration of the input/output control unit that controls the battery input/output will be described below, with reference to FIG. 5 and FIG. 6.

In Step S21, after the input/output control is started, thermistor temperature TL3 by the cell minimum temperature is measured from the first thermistor 11h, the second thermistor 12L, the second thermistor 12h, and the third thermistor 13L, and the steps proceeds to Step S23.

In Step S22, after the input/output control is started, thermistor temperature Th1 by the cell maximum temperature is measured from the first thermistor 11h, the second thermistor 12L, the second thermistor 12h, and the third thermistor 13L, and the steps proceeds to Step S23.

In Step S23, following the measurement of the thermistor temperature TL3 by the cell minimum temperature in Step S21 and the measurement of the thermistor temperature Th1 by the cell maximum temperature in Step S22, an input/output MAP (FIG. 6) showing the relationship between the allowable input/output torque and the battery temperature is read, and the steps proceeds to Step S24. Here, in the input/output MAP, the allowable input/output torque is maximum when the battery temperature is between T1-T2, as illustrated in FIG. 6. However, in a low temperature range that it equal to or less than battery temperature T1, the allowable input/output torque is limited more as the battery temperature is reduced. In addition, in a high temperature range that is equal to or greater than battery temperature T2, the allowable input/output torque is limited more as the battery temperature is increased.

In Step S24, following the reading of the input/output MAP in Step S23, the allowable input/output torque is determined by select-low using the thermistor temperature TL3 (MIN) by cell minimum temperature and the thermistor temperature Th1 (MAX) by cell maximum temperature and the input/output MAP, the allowable input/output torque information is transmitted to the hybrid control module 14 (HCM), and the steps proceeds to Step S25.

In Step S25, following the transmission of the allowable input/output torque information to the HCM in Step S24, an upper limit torque instruction is outputted from the hybrid control module 14 to the motor controller 16 (MC), and the steps proceeds to END.

Diagnostic Steps Configuration

Figure 7:
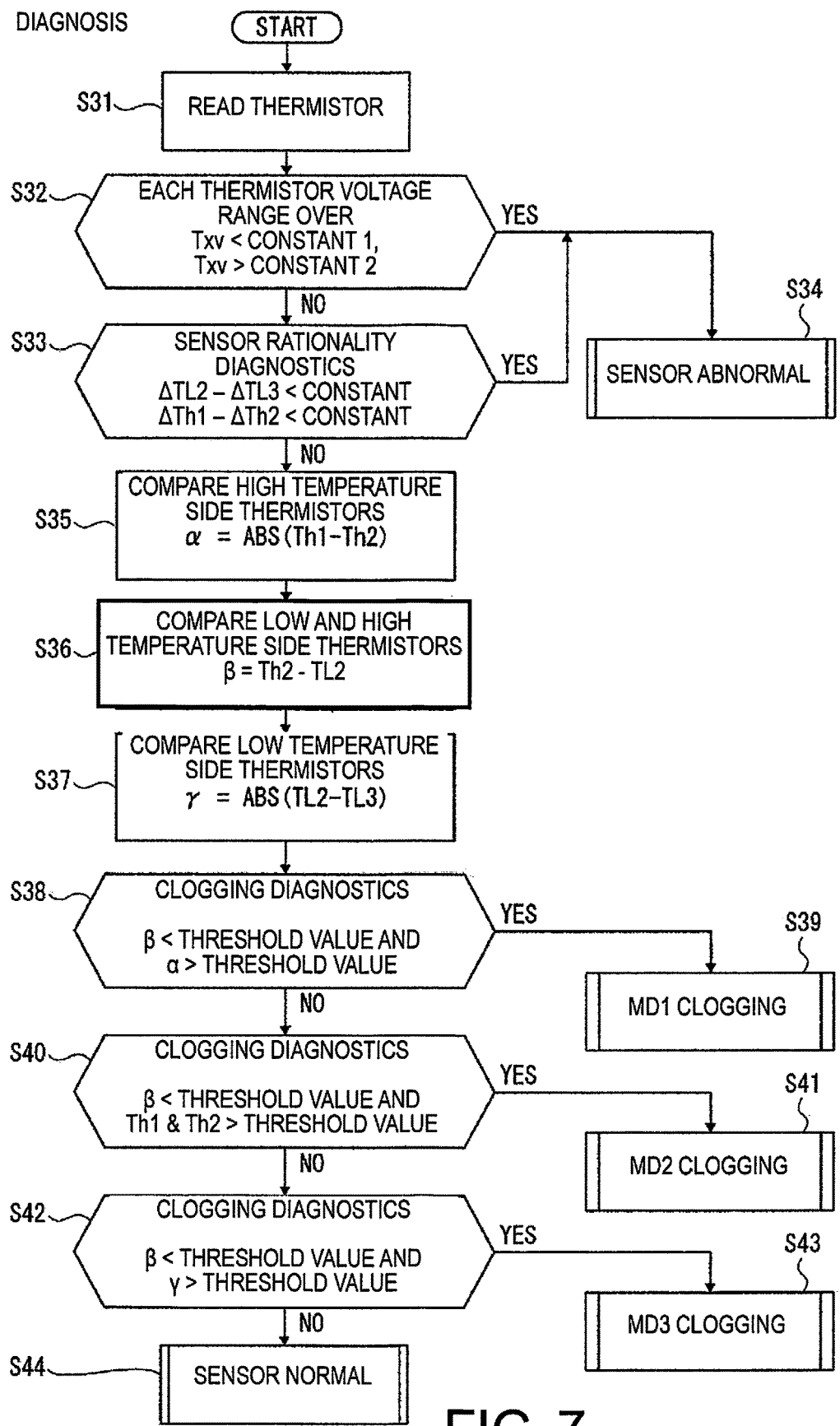
FIG. 7 is a flowchart illustrating the flow of the diagnostic steps that are executed in the hybrid control module (HCM) of the battery pack cooling system of the first embodiment.

FIG. 7 illustrates the flow of the diagnostic steps that are executed by the hybrid control module 14 (HCM). Each of the steps that represent the diagnostic unit, which carries out sensor rationality diagnostics as well as clogging diagnostics, in which cooling air flow failure occurs in the modules 31, 32, 33, will be described below with reference to FIG. 7. This diagnostic steps are executed by driving the cooling fan 4 at a predetermined FAN speed after the ignition switch is turned ON, in a situation in which predetermined changes have appeared in the thermistor temperatures Th1, TL2, Th2, TL3 (diagnostic conditions established status), if the temperature sensor is normal when the battery is being cooled while maintaining the fan drive state.

In Step S31, the diagnostic step is started after the ignition switch is turned ON, thermistor temperatures Th1, TL2, Th2, TL3 from the first thermistor 11h, the second thermistor 12L, the second thermistor 12h, and the third thermistor 13L are read a plurality of times at a constant cycle, and the steps proceeds to Step S32.

In Step S32, following the reading of the thermistor temperatures Th1, TL2, Th2, TL3 in Step S31, whether or not the signal voltages Txv outputted from the first thermistor 11h, the second thermistor 12L, the second thermistor 12h, and the third thermistor 13L are outside of the normal range (constant 1≤Txv≤constant 2) is determined. In the case of YES (Txv<constant 1 or Txv>constant 2), the steps proceeds to Step S34, and in the case of NO (constant 1≤Txv≤constant 2), the steps proceeds to Step S33.

In Step S33, following the determination that constant 1≤Txv≤constant 2 in Step S32, a sensor rationality diagnostics on whether or not it is irrational is carried out, based on the thermistor temperatures Th1, TL2, Th2, TL3 from the first thermistor 11h, the second thermistor 12L, the second thermistor 12h, and the third thermistor 13L. In the case of YES (no rationality), the steps proceeds to Step S34, and in the case of NO (there is rationality), the steps proceeds to Step S35.

In a sensor rationality diagnostics, it is diagnosed as no rationality when a value obtained by subtracting a decreasing gradient ΔTL3 of the thermistor temperature TL3 on the low temperature side from a decrease gradient ΔTL2 of the thermistor temperature TL2 on the low temperature side becomes less than a constant (ΔTL2−ΔTL3<constant). This is primarily due to ΔTL2 (cooling air amount small) becoming >ΔTL3 (cooling air amount large). Additionally, it is diagnosed as no rationality when a value obtained by subtracting a decreasing gradient ΔTh2 of the thermistor temperature Th2 on the high temperature side from a decrease gradient ΔTh1 of the thermistor temperature Th1 on the high temperature side becomes less than a constant (ΔTh1−ΔTh2<constant). This is primarily due to ΔTh1 (cooling air amount small) becoming >ΔTh2 (cooling air amount large).

In Step S34, following a YES determination in Step S32 or a YES determination in Step S33, a diagnosis result is issued that the first thermistor 11$h$, the second thermistor 12L, the second thermistor 12$h$, and the third thermistor 13L are sensor abnormal.

In Step S35, following the determination that there is rationality in Step S33, a comparison value $\alpha$ between the thermistor temperatures Th1, Th2 from the two high temperature side thermistors, first thermistor 11$h$ and second thermistor 12$h$, is calculated, and the steps proceeds to Step S36. Here, the comparison value $\alpha$ is calculated from the absolute value of the difference between the thermistor temperature Th1 and the thermistor temperature Th2 ($\alpha$=ABS (Th1−Th2)).

In Step S36, following the comparison of the high temperature side thermistors in Step S35, a comparison value $\beta$ between thermistor temperatures Th2, TL2 from the low and high temperature side thermistors second thermistor 12$h$ and second thermistor 12L, which are attached to one first cell module 32, is calculated, and the steps proceeds to Step S37. Here, the comparison value $\beta$ is calculated from the difference between the thermistor temperature Th2 and the thermistor temperature TL2 ($\beta$=Th2−TL2).

In Step S37, following the comparison of the low and high temperature side thermistors in Step S36, a comparison value $\gamma$ between thermistor temperatures TL2, TL3 from the two low temperature side thermistors, second thermistor 12L and third thermistor 13L, is calculated, and the steps proceeds to Step S38. Here, the comparison value $\gamma$ is calculated from the absolute value of the difference between the thermistor temperature TL2 and the thermistor temperature TL3 ($\gamma$=ABS (TL2−TL3)).

In Step S38, following the comparison of the low temperature side thermistors in Step S37, whether or not the second cell module 31 is clogged is diagnosed, using the comparison value $\alpha$ and the comparison value $\beta$. In the case of YES (MD1 clogging present), the steps proceeds to Step S39. In the case of NO (MD1 clogging absent), the steps proceeds to Step S40. Clogging of the second cell module 31 is diagnosed when the conditions of $\beta$<threshold value and $\alpha$>threshold value are established. This is because, if clogging occurs due to an intrusive substance into the second cooling branch passage 61, the flow of cooling air in the second cooling branch passage 61 is stagnated, and the flow of cooling air in the first cooling branch passage 62 and the third cooling branch passage 63 is also slowed due to increased resistance. Consequently, the temperature difference between the downstream side and the upstream side of the first cell module 32 becomes small ($\beta$<threshold value), and the thermistor temperature Th1 becomes high ($\alpha$>threshold value).

In Step S39, following the diagnosis that clogging is present in MD1 in Step S38, a diagnosis result is issued that the second cell module 31 set in the second cooling branch passage 61 is clogged.

In Step S40, following the diagnosis that clogging is absent in MD1 in Step S38, whether or not the first cell module 32 is clogged is diagnosed, using the comparison value $\beta$, the thermistor temperature Th1, and the thermistor temperature Th2. In the case of YES (MD2 clogging present), the steps proceeds to Step S41. In the case of NO (MD2 clogging absent), the steps proceeds to Step S42. Clogging of the first cell module 32 is diagnosed when the conditions of $\beta$<threshold value and Th1 & Th2>threshold value (or TL2 & TL3>threshold value) are established. This is because, if clogging occurs due to an intrusive substance into the first cooling branch passage 62, the flow of cooling air in the first cooling branch passage 62 is stagnated, and the flow of cooling air in the second cooling branch passage 61 and the third cooling branch passage 63 is also slowed due to increased resistance. Consequently, the temperature difference between the downstream side and the upstream side of the first cell module 32 becomes small ($\beta$<threshold value), and the thermistor temperatures Th1, TL2, Th2, TL3 become high (Th1 & Th2>threshold value, TL2 & TL3>threshold value).

In Step S41, following the diagnosis that clogging is present in MD2 in Step S40, a diagnosis result is issued that the first cell module 32 set in the first cooling branch passage 62 is clogged.

In Step S42, following the diagnosis that clogging is absent in MD2 in Step S40, whether or not the third cell module 33 is clogged is diagnosed, using the comparison value $\beta$ and the comparison value $\gamma$. In the case of YES (MD3 clogging present), the steps proceeds to Step S43. In the case of NO (MD3 clogging absent), the steps proceeds to Step S44. Clogging of the third cell module 33 is diagnosed when the conditions of $\beta$<threshold value and $\gamma$>threshold value are established. This is because, if clogging occurs due to an intrusive substance into the third cooling branch passage 63, the flow of cooling air in the third cooling branch passage 63 is stagnated, and the flow of cooling air in the second cooling branch passage 61 and the first cooling branch passage 62 is also slowed due to increased resistance. Consequently, the temperature difference between the downstream side and the upstream side of the first cell module 32 becomes small ($\beta$<threshold value), and the thermistor temperature TL2 becomes high ($\gamma$>threshold value).

In Step S43, following the diagnosis that clogging is present in MD3 in Step S42, a diagnosis result is issued that the third cell module 33 set in the third cooling branch passage 63 is clogged.

In Step S44, following the diagnosis that clogging is absent in MD3 in Step S42, the first thermistor 11$h$, the second thermistor 12L, the second thermistor 12$h$, and the third thermistor 13L, which are the temperature sensors, are diagnosed to be normal.

Next, the actions are described. Upon describing the thermistor attaching action of the present invention in a battery pack in which a cell module is set to each of a plurality of cooling branch passages disposed to link a cooling air inlet passage to a cooling air exhaust passage in parallel, if the thermistor attachment patterns are classified into three patterns, the three patterns will be as follows.

Thermistor Attachment Pattern 1

A pattern in which a thermistor is installed to each of an upstream position and a downstream position of only one cell module, of the plurality of cell modules.

Thermistor Attachment Pattern 2

A pattern in which a thermistor is installed to each of an upstream position and a downstream position of one cell module, of the plurality of cell modules. In addition, a thermistor that measures the temperature of either the highest temperature or the lowest temperature is installed in one of the other cell modules.

Thermistor Attachment Pattern 3

A pattern in which a thermistor is installed to each of an upstream position and a downstream position of one cell module, of the plurality of cell modules. In addition, a thermistor that measures the highest temperature is installed in one of the other cell modules and a thermistor that measures the lowest temperature is installed in the cell module that is different from the above two cell modules (the pattern of the first embodiment).

The Action according to thermistor attachment pattern 1, Action according to thermistor attachment pattern 2, and Action according to thermistor attachment pattern 3 will be separately described below regarding the actions of the battery pack cooling system.

Action According to Thermistor Attachment Pattern 1

The thermistor attachment pattern 1 is a pattern in which, in the first embodiment, the second thermistor 12L is installed in an upstream position of the first cell module 32, and the second thermistor 12h is installed in a downstream position of the first cell module 32. That is, the pattern is one in which the first thermistor 11h and the third thermistor 13L are removed in the first embodiment.

In the case of this thermistor attachment pattern 1, minimum range temperature information is obtained from the second thermistor 12L which is installed in an upstream position of the first cell module 32, where introduction of cooling air is started. On the other hand, maximum range temperature information is obtained from the second thermistor 12h which is installed in a downstream position of the first cell module 32, where the cooling air that has removed heat is discharged.

Therefore, fan control (battery temperature control) can be carried out using maximum range temperature information (thermistor temperature Th2) from the second thermistor 12h. That is, the first embodiment is provided with a first thermistor 11h that measures the highest temperature in the entire battery pack. Accordingly, when measuring the battery request FAN speed in the fan control illustrated in FIG. 4, the battery request FAN speed is calculated using a battery FAN speed map and the thermistor temperature Th1 from the first thermistor 11h. On the other hand, the battery request FAN speed is calculated using the battery FAN speed map and the thermistor temperature Th2, by changing the thermistor temperature Th1 to the thermistor temperature Th2. However, since the thermistor temperature Th2 becomes the second highest temperature after the thermistor temperature Th1, battery request FAN speed can be measured with sufficient accuracy.

In addition, battery input/output control can be carried out using minimum range temperature information (thermistor temperature TL2) from the second thermistor 12L and maximum range temperature information (thermistor temperature Th2) from the second thermistor 12h. That is, the first embodiment includes a first thermistor 11h that measures the highest temperature, and a third thermistor 13L that measures the lowest temperature, in the entire battery pack. Accordingly, when measuring the allowable input/output torque in the battery input/output control illustrated in FIG. 5, the allowable input/output torque is calculated using the thermistor temperature Th1, the thermistor temperature TL3, and the input/output MAP. On the other hand, the allowable input/output torque is calculated using the thermistor temperature Th2, the thermistor temperature TL2, and the input/output MAP, by changing the thermistor temperature Th1 to the thermistor temperature Th2, and changing the thermistor temperature TL3 to the thermistor temperature TL2. However, since the thermistor temperature Th2 can become the second highest temperature after the thermistor temperature Th1, and the thermistor temperature TL2 becomes the second lowest temperature after the thermistor temperature TL3, the allowable input/output torque can be calculated with sufficient accuracy.

Furthermore, it is possible to diagnose that one of the modules 31, 32, 33 is clogged, using the temperature difference information (=comparison value β) between the maximum range temperature (thermistor temperature Th2) and the minimum range temperature (thermistor temperature TL2). That is, the first embodiment includes a first thermistor 11h that measures the highest temperature, and a third thermistor 13L that measures the lowest temperature, in the entire battery pack. Accordingly, in the diagnostic steps illustrated in FIG. 7, it is possible to perform clogging diagnostics for specifying in which module clogging has occurred, of the modules 31, 32, 33. In this respect, as is clear from each of the diagnosis conditions of Step S38, Step S40, and Step S42 illustrated in FIG. 7, the condition β<threshold value is included in all of the diagnosis conditions. Accordingly, as long as the condition β<threshold value can be diagnosed, even if the module in which clogging has occurred cannot be specified, it is possible to diagnose that one of the modules 31, 32, 33 is clogged.

As a result, in the case of the thermistor attachment pattern 1, fan control (battery temperature control), battery input/output control, and cell module clogging diagnostics can be carried out, while keeping the number of temperature sensors (second thermistor 12L, second thermistor 12h) installed to the minimum number of two.

Action According to Thermistor Attachment Pattern 2

The thermistor attachment pattern 2 is a pattern in which, in the first embodiment, the second thermistor 12L is installed in an upstream position of the first cell module 32, and the second thermistor 12h is installed in a downstream position of the first cell module 32. In addition, there is a pattern 2-1 in which the first thermistor 11h is installed in a downstream position of the second cell module 31, and a pattern 2-2 in which the third thermistor 13L is installed in an upstream position of the third cell module 33. That is, the pattern is one in which either the first thermistor 11h or the third thermistor 13L is removed in the first embodiment.

In the embodiment of the thermistor attachment pattern 2-1 described above, minimum range temperature information is obtained from the second thermistor 12L, maximum range temperature information is obtained from the second thermistor 12h, and maximum temperature information which is the highest in the entire battery pack is obtained from the first thermistor 11h.

Therefore, fan control (battery temperature control) can be carried out using maximum range temperature information (thermistor temperature Th1) from the first thermistor 11h. In other words, when measuring the battery request FAN speed in the fan control illustrated in FIG. 4, a highly accurate battery request FAN speed can be calculated using a battery FAN speed map and the thermistor temperature Th1 from the first thermistor 11h, in the same way as in the first embodiment.

In addition, battery input/output control can be carried out using minimum range temperature information (thermistor temperature TL2) from the second thermistor 12L and maximum range temperature information (thermistor temperature Th1) from the first thermistor 11h. Therefore, when measuring the allowable input/output torque in the battery input/output control illustrated in FIG. 5, the allowable input/output torque can be calculated more accurately than in the thermistor attachment pattern 1, insomuch as the maximum temperature information can be obtained, by using the thermistor temperature Th1, the thermistor temperature TL2, and the input/output MAP.

Furthermore, clogging diagnostics of the cell modules and sensor rationality diagnostics can be carried out using the comparison value α of the high temperature side thermistors (=ABS(Th1−Th2)), the comparison value β of the low and high temperature side thermistors (=Th2−TL2), and the two high temperature side thermistor temperatures Th1, Th2.

That is, in the diagnostic steps illustrated in FIG. 7, while the comparison value γ of the low temperature side thermistors (=ABS(TL2−TL3)) cannot be obtained, it is possible to specify that clogging has occurred in either the second cell module 31 or the first cell module 32, using the comparison values α, β, and thermistor temperatures Th1, Th2. Then, if clogging is diagnosed by other than the above, it can be specified that clogging has occurred in the third cell module 33.

In the case of the thermistor attachment pattern 2-2 described above, minimum range temperature information is obtained from the second thermistor 12L, maximum range temperature information is obtained from the second thermistor 12h, and lowest temperature information which is the lowest in the entire battery pack is obtained from the third thermistor 13L.

Therefore, fan control (battery temperature control) can be carried out using maximum range temperature information (thermistor temperature Th2) from the second thermistor 12h. In other words, when measuring the battery request FAN speed in the fan control illustrated in FIG. 4, a sufficiently accurate battery request FAN speed can be calculated using a battery FAN speed map and the thermistor temperature Th2 from the second thermistor 12h, in the same way as in the thermistor attachment pattern 1.

In addition, battery input/output control can be carried out using minimum range temperature information (thermistor temperature TL3) from the third thermistor 13L and maximum range temperature information (thermistor temperature Th2) from the second thermistor 12h. Therefore, when measuring the allowable input/output torque in the battery input/output control illustrated in FIG. 5, the allowable input/output torque can be calculated more accurately than in the thermistor attachment pattern 1, insomuch as the minimum temperature information can be obtained, by using the thermistor temperature Th2, the thermistor temperature TL3, and the input/output MAP.

In addition, clogging diagnostics of the cell modules and sensor rationality diagnostics can be carried out using the comparison value β of the low and high temperature side thermistors (=Th2−TL2), the comparison value γ of the low temperature side thermistors (=ABS(TL2−TL3)), and the two low temperature side thermistor temperatures TL2, TL3. That is, in the diagnostic steps illustrated in FIG. 7, while the comparison value α of the high temperature side thermistors cannot be obtained, it is possible to specify that clogging has occurred in either the first cell module 32 or the third cell module 33, using the comparison values α, γ, and thermistor temperatures TL2, TL3. Then, if clogging is diagnosed by other than the above, it can be specified that clogging has occurred in the second cell module 31.

As a result, in the case of the thermistor attachment pattern 2, fan control (battery temperature control), battery input/output control, cell module clogging diagnostics, and sensor rationality diagnostics can be carried out, while suppressing the number of temperature sensors installed to three. Then, in the case of thermistor attachment pattern 2-1, the control accuracy of the fan control is improved by adding the first thermistor 11h, which obtains maximum temperature information, to the thermistor attachment pattern 1.

Action According to Thermistor Attachment Pattern 3

The thermistor attachment pattern 3 is a pattern in which the second thermistor 12L and the second thermistor 12h are installed in the upstream position and the downstream position of the first cell module 32. In addition, the pattern is one in which, in the first embodiment, the first thermistor 11h is installed in a downstream position of the second cell module 31, and the third thermistor 13L is installed in an upstream position of the third cell module 33.

The thermistor attachment pattern 1 is a pattern in which, the cell temperature distribution of a cell module selected as a representative (first cell module 32) from among the three cell modules 31, 32, 33, can be grasped. The thermistor attachment pattern 2 is a pattern in which the cell temperature distribution of the first cell module 32 can be grasped by enlarging to the high temperature side or enlarging to the low temperature side. In contrast, the thermistor attachment pattern 3 is a pattern in which the cell temperature distribution can be enlarged and grasped from the minimum temperature to the maximum temperature, with the cell temperature distribution of the first cell module 32 set as a reference.

Therefore, fan control (battery temperature control) can be carried out using maximum range temperature information (thermistor temperature Th1) from the first thermistor 11h. Accordingly, when measuring the battery request FAN speed in the fan control illustrated in FIG. 4, highly accurate battery request FAN speed can be calculated using a battery FAN speed map and the thermistor temperature Th1 from the first thermistor 11h.

In addition, battery input/output control can be carried out using minimum temperature information (thermistor temperature TL3) from the third thermistor 13L and maximum temperature information (thermistor temperature Th1) from the first thermistor 11h. Accordingly, when measuring the allowable input/output torque in the battery input/output control illustrated in FIG. 5, an accurate allowable input/output torque can be calculated using the thermistor temperature Th1, the thermistor temperature TL3, and the input/output MAP.

In addition, clogging diagnostics of the cell modules and sensor rationality diagnostics can be carried out using the comparison value α of the high temperature side thermistors, the comparison value β of the low and high temperature side thermistors, the comparison value γ of the low temperature side thermistors, the two high temperature side thermistor temperatures Th1, Th2, and the two low temperature side thermistor temperatures TL2, TL3. That is, in the diagnostic steps illustrated in FIG. 7, it is possible to specify in which of the second cell module 31, the first cell module 32, and the third cell module 33 clogging has occurred, using the comparison values α, β, γ, and the thermistor temperatures Th1, TL2, Th2, TL3. In addition, in the diagnostic steps illustrated in FIG. 7, a highly accurate sensor rationality diagnostics can be carried out, using the two high temperature side thermistor temperatures Th1, Th2, and the two low temperature side thermistor temperatures TL2, TL3.

As a result, in the case of the thermistor attachment pattern 3, fan control (battery temperature control), battery input/output control, cell module clogging diagnostics, and sensor rationality diagnostics can all be carried out with high accuracy, while suppressing the number of temperature sensors installed to four.

In addition, for example, compared to a case in which two thermistors are installed per each of the three cell modules 31, 32, 33 (number of thermistors is six), the number of thermistors installed (four) and the number of related parts can be reduced. Accordingly, weight reduction and cost reduction become possible. Additionally, the probability of a malfunction occurring can be reduced by reducing the number of thermistors.

Furthermore, sensor diagnostics of four thermistors 11h, 12L, 12h, 13L can be carried out with high accuracy. Accordingly, by being able to detect battery cooling failure before a battery failure occurs, battery repair costs and battery replacement costs can be reduced. Furthermore, the on-board diagnostics function can be improved, such as reducing erroneous diagnosis by accurately diagnosing abnormalities of the thermistors 11*h*, 12L, 12*h*, 13L.

Next, the effects are described. The effects listed below can be obtained with the battery pack cooling system according to the first embodiment.

(1) A battery pack cooling system in which cell modules 31, 32, 33 configured from a plurality of cells (cell cans 31*a*) are set in an internal space of a battery pack case 1 so as to have a cooling passage, thereby cooling the cell modules 31, 32, 33 by cooling air flowing in the cooling passage, wherein the cooling passage is configured comprising a cooling air inlet passage 51, a cooling air exhaust passage 71, and a plurality of cooling branch passages 61, 62, 63 disposed to link the cooling air inlet passage 51 and the cooling air exhaust passage 71 in parallel, the cell modules 31, 32, 33 are installed respectively in the plurality of cooling branch passages 61, 62, 63, and temperature sensors (second thermistors 12L, 12*h*) are respectively installed in an upstream position and a downstream position of one cell module (first cell module 32) of the plurality of cell modules 31, 32, 33. Accordingly, battery temperature control (fan control), battery input/output control, and cell module clogging diagnostics can be carried out, while keeping the number of temperature sensors (second thermistors 12L, 12*h*) installed to a minimum (two).

(2) A minimum temperature sensor (second thermistor 12L) is installed in an upstream position which becomes the lowest temperature, and a maximum temperature sensor (second thermistor 12*h*) is installed in a downstream position which becomes the highest temperature, in one cell module (first cell module 32) among the plurality of cell modules 31, 32, 33, and a temperature sensor (the first thermistor 11*h* or the third thermistor 13L) that measures the temperature of either the highest temperature or the lowest temperature is installed in one of the other cell modules (the second cell module 31 or the third cell module 33) (FIG. 1). Accordingly, in addition to the effect of (1), battery temperature control (fan control), battery input/output control, cell module clogging diagnostics, and sensor rationality diagnostics can be carried out, while keeping the number of temperature sensors (second thermistors 12L, 12*h*+the first thermistor 11*h* or the third thermistor 13L) installed to three.

(3) A minimum temperature sensor (second thermistor 12L) is installed in an upstream position which becomes the lowest temperature, and a maximum temperature sensor (second thermistor 12*h*) is installed in a downstream position which becomes the highest temperature, in one cell module (first cell module 32) among the plurality of cell modules 31, 32, 33, a maximum temperature sensor (first thermistor 11*h*) that measures the maximum temperature is installed in one of the other cell modules (second cell module 31) of the plurality of cell modules 31, 32, 33, and a minimum temperature sensor (third thermistor 13L) that measures the minimum temperature is installed in a cell module that is different from the above two cell modules (third cell module 33) of the plurality of cell modules 31, 32, 33 (FIG. 1). Accordingly, in addition to the effect of (1), fan control (battery temperature control), battery input/output control, cell module clogging diagnostics, and sensor rationality diagnostics can all be carried out with high accuracy, while suppressing the number of temperature sensors (thermistors 11*h*, 12L, 12*h*, 13L) installed to four.

(4) The temperature sensor that measures the highest temperature (the first thermistor 11*h*) is disposed in a downstream position of the cell module (second cell module 31), which becomes the highest temperature region in the entire battery pack, and the temperature sensor that measures the lowest temperature (the third thermistor 13L) is disposed in an upstream position of the cell module (third cell module 33), which becomes the lowest temperature region in the entire battery pack (FIG. 1). Accordingly, in addition to the effect of (3), a further improvement in the accuracy of the fan control (battery temperature control), battery input/output control, cell module clogging diagnostics, and sensor rationality diagnostics can be achieved, while suppressing the number of temperature sensors (thermistors 11*h*, 12L, 12*h*, 13L) installed to four.

(5) A second cell module 31, a first cell module 32, and a third cell module 33 are set as cell modules respectively in a second cooling branch passage 61, a first cooling branch passage 62, and a third cooling branch passage 63, which are arranged in parallel from the upstream side to the downstream side of the flow of the cooling air, and a first maximum temperature sensor (first thermistor 11*h*) is installed in a downstream position of the second cell module 31, a second minimum temperature sensor (second thermistor 12L) and a second maximum temperature sensor (second thermistor 12*h*) are respectively installed in an upstream position and a downstream position of the first cell module 32, and a third minimum temperature sensor (third thermistor 13L) is installed in an upstream position of the third cell module 33 (FIG. 1). Accordingly, in addition to the effects of (1)-(4), highly accurate fan control (battery temperature control), battery input/output control, cell module clogging diagnostics, and sensor rationality diagnostics can be carried out using four temperature sensors (thermistors 11*h*, 12L, 12*h*, 13L), in a battery pack BP in which cell modules 31, 32, 33 are respectively set in the three cooling branch passages 61, 62, 63.

(6) The cell module 31 is configured by arranging a plurality of cylindrical shape cell cans 31*a* so that the can axes are parallel to each other, to configure a first cell can line 31*b* and a second cell can line 31*c*, which are superposed as two layers so that the can axis interval is shifted by half pitch, and held in a state in which a cold air passage clearance t is secured between mutually adjacent can barrels (FIG. 2). Accordingly, in addition to the effects of (1)-(5), passage resistance of the cooling air that passes through the cell module 31 from the upstream side to the downstream side can be suppressed low, and the plurality of cell cans 31*a* can be cooled effectively by the cooling air.

(7) The temperature sensors are thermistors 11*h*, 12L, 12*h*, 13L that measure the temperature by utilizing the resistance change with respect to the temperature change, and the thermistors 11*h*, 12L, 12*h*, 13L are respectively attached to the can bottom surfaces of cylindrical shape cell cans arranged in the end positions of the cell modules 31, 32, 33 (FIG. 3). Accordingly, in addition to the effect of (6), the maximum cell temperature and the minimum cell temperature of the cell modules 31, 32, 33 can be accurately obtained, by a configuration that detects, not the ambient temperature, but the temperature of the cell cans themselves.

(8) A controller (hybrid control module 14) that carries out a calculation step based on temperature information from the temperature sensors (thermistors 11*h*, 12L, 12*h*, 13L) is provided, wherein the controller (hybrid control module 14) comprises a diagnostic unit (FIG. 7) that diagnoses clogging in which cooling air flow failure occurs in the modules 31, 32, 33, using a difference value (comparison value β: β=Th2−TL2) between the maximum temperature information (thermistor temperature Th2) and the minimum temperature information (thermistor temperature TL2) from one cell module (first cell module 32). Accordingly, in addition to the effects of (1)-(7), clogging diagnostics can be carried out by grasping the cell temperature distribution of one cell module (first cell module 32) among the cell modules 31, 32, 33.

(9) The diagnostic unit (FIG. 7) carries out a rationality diagnosis of the temperature sensors (thermistors 11h, 12L, 12h, 13L) using the difference (ΔTL2−ΔTL3) between the temperature change gradients from two minimum temperature sensors (thermistors 12L, 13L) in which the minimum temperatures can be compared, and the difference (ΔTh1−ΔTh2) between the temperature change gradients from two maximum temperature sensors (thermistors 11h, 12h) in which the maximum temperatures can be compared. Accordingly, in addition to the effect of (8), sensor rationality diagnostics can be accurately carried out using the temperature change gradient from two pieces of low temperature side information and the temperature change gradient from two pieces of high temperature side information.

(10) Controllers (lithium ion battery controller 9, hybrid control module 14) that carry out a calculation step based on temperature information from the temperature sensors (thermistors 11h, 12L, 12h, 13L) are provided, wherein the controllers (lithium ion battery controller 9, hybrid control module 14) comprise an input/output control unit (FIGS. 5, 6) that controls the battery input/output, using the minimum temperature information (thermistor temperatures TL2 or TL3) and the maximum temperature information (thermistor temperatures Th1 or Th2). Accordingly, in addition to the effects of (1)-(9), battery input/output control that can accurately obtain the allowable input/output torque can be carried out, using two pieces of temperature information, the minimum temperature information and the maximum temperature information, related to the temperature dependency of the battery.

(11) A controller (hybrid control module 14) that carries out a calculation steps based on temperature information from the temperature sensors (thermistors 11h, 12L, 12h, 13L) is provided, wherein the controller (hybrid control module 14) comprises a fan control unit (FIG. 4) that controls the battery cooling air amount using the maximum temperature information (thermistor temperature Th1 or Th2). Accordingly, in addition to the effects of (1)-(10), a fan control in which the battery temperature is accurately reduced can be carried out using the maximum temperature information.

The battery pack cooling system of the present invention was described above based on the first embodiment, but specific configurations thereof are not limited to the first embodiment, and various modifications and additions to the design can be made without departing from the scope of the invention according to each claim in the Claims.

Figure 8:
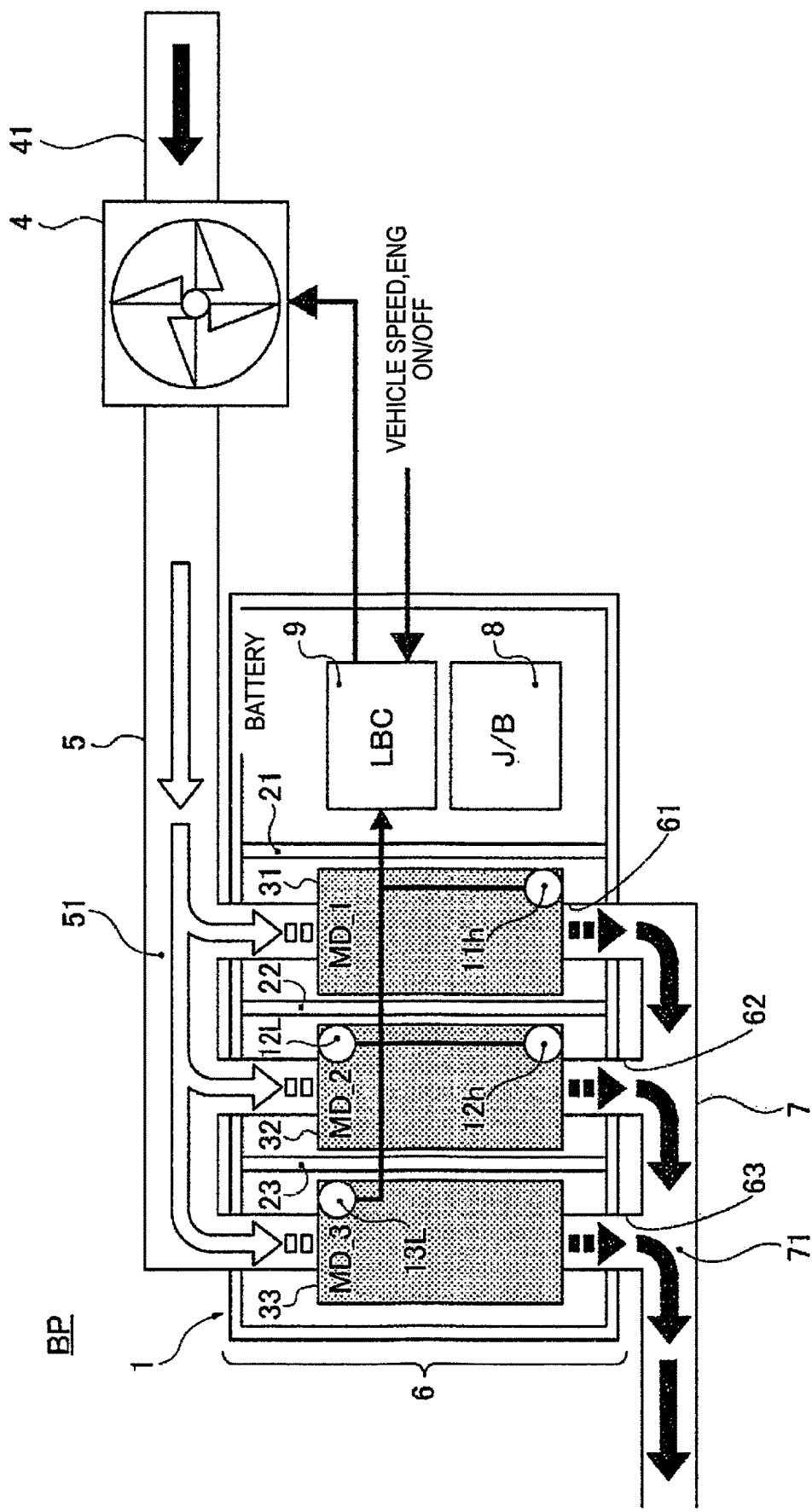
FIG. 8 is a view illustrating the overall system of the battery pack cooling system, showing another example in which the fan control steps are directly executed by the lithium ion battery controller (LBC).

In the first embodiment, an example was shown in which the fan control steps are executed by a hybrid control module 14 (HCM). However, the fan control steps may be directly executed in the lithium ion battery controller 9 (LBC), as illustrated in FIG. 8.

In the first embodiment, an example was shown in which the three cell modules 31, 32, 33 are set in three cooling branch passages 61, 62, 63. However, the cell modules can be those that comprise two cell modules or those that comprise four or more cell modules, as long as there is a plurality of cell modules.

In the first embodiment, an example was shown in which a first thermistor 11h is installed in a downstream position of the second cell module 31, a second thermistor 12L and a second thermistor 12h are respectively installed in an upstream position and a downstream position of the first cell module 32, and a third thermistor 13L is installed in an upstream position of the third cell module 33, as a thermistor attachment pattern. However, the thermistor attachment pattern is not limited to the thermistor attachment pattern 3 of the first embodiment, and may be the thermistor attachment pattern 1 in which a thermistor is installed in each of an upstream position and a downstream position of only one cell module of the plurality of cell modules. Furthermore, the pattern may be the thermistor attachment pattern 2, in which a thermistor is installed to each of an upstream position and a downstream position of one cell module of the plurality of cell modules, in addition to which, a thermistor that measures the temperature of either the highest temperature or the lowest temperature is installed in one of the other cell modules.

In the first embodiment, an example was shown in which a plurality of cylindrical shape cell cans 31a are used as the cell module 31, as illustrated in FIG. 2. However, the cell module may be one in which cells with different shapes, such as a plurality of cell boxes, are used, as long as the configuration secures a flow of cooling air.

In the first embodiment, an example was shown in which the battery pack cooling system of the present invention is applied to a battery pack that is mounted on an FF hybrid vehicle or an FR hybrid vehicle. However, the battery pack cooling system of the present invention may be applied to a battery pack that is mounted on a plug-in hybrid vehicle or an electric vehicle as well.

It is noted that labels such as first, second and third are merely exemplary and are interchangeable as described herein.

What is claimed is:

1. A battery pack cooling system comprising:
a battery pack case;
a plurality cell modules disposed in an internal space of the battery pack case so as to form a cooling passage that cools the cell modules by cooling air flowing in the cooling passage, the cell modules including a first cell, a second cell module and a third cell module, the cooling passage including a cooling air inlet passage, a cooling air exhaust passage, and a plurality of cooling branch passages disposed to connect the cooling air inlet passage and the cooling air exhaust passage in parallel, the first cell module being disposed in a first cooling branch passage of the plurality of cooling branch passages, the second cell module being disposed in a second cooling branch passage of the plurality of cooling branch passages, and the third cell module disposed in a third cooling branch passage of the plurality of cooling branch passages, the first cooling branch passage, the second cooling branch passage, and the third cooling branch passage being arranged in parallel from an upstream side to a downstream side of the flow of the cooling air;
a first minimum temperature sensor disposed in an upstream position of the first cell module to measure a lowest temperature region in the first cell module;
a second minimum temperature sensor disposed in an upstream position in the third cell module to measure a lowest temperature region in the third cell module;
a first maximum temperature sensor disposed in a downstream position of the second cell module to measure a highest temperature region in the second cell module;

a second maximum temperature sensor disposed in a downstream position of the first cell module to measure a highest temperature region in the first cell module;

a controller comprising a diagnostic unit configured to perform rationality diagnosis based on temperature information from the first minimum temperature sensor, the second minimum temperature sensor, the first maximum temperature sensor and the second maximum temperature sensor using at least one of:

a difference between temperature change gradients from the first minimum temperature sensor and the second minimum temperature sensor in which a lowest temperature in the first cell module and a lowest temperature in the third cell module can be compared, and a difference between temperature change gradients from the second maximum temperature sensor and the first maximum temperature sensor in which a highest temperature in the first cell module and the highest temperature in the second cell module can be compared.

2. The battery pack cooling system according to claim 1, wherein
the first maximum temperature sensor is disposed in a downstream position of the second cell module, which becomes a highest temperature region in an entirety of the battery pack, and
the second minimum temperature sensor is disposed in an upstream position of the third cell module, which becomes a lowest temperature region in an entirety of the battery pack.

3. The battery pack cooling system according to claim 1, wherein
the first cell module is formed by arranging a plurality of cylindrical shape cell cans so that can axes are parallel to each other to configure a first cell can line and a second cell can line, which are superposed as two layers so that a can axis interval is shifted by half pitch, and held in a state in which a cold air passage clearance is secured between mutually adjacent can barrels.

4. The battery pack cooling system according to claim 3, wherein
the first minimum temperature sensor and the second maximum temperature sensor are thermistors that are configured to measure temperature by utilizing resistance change with respect to temperature change, and
the first minimum temperature sensor and the second maximum temperature sensor are respectively attached to can bottom surfaces of the cell cans that are arranged in end positions of the first cell module.

5. The battery pack cooling system according to claim 1, wherein
the diagnostic unit is configured to diagnose clogging in which cooling air flow failure occurs in the cell modules using a difference value between maximum temperature information and minimum temperature information from the first cell module.

6. The battery pack cooling system according to claim 1, wherein
the controller comprises an input/output control unit configured to control a battery input/output using minimum temperature information and maximum temperature information.

7. The battery pack cooling system according to claim 1, wherein
the controller comprises a fan control unit configured to control a battery cooling air amount, using maximum temperature information.

* * * * *